(12) United States Patent
Champalou et al.

(10) Patent No.: US 10,279,821 B2
(45) Date of Patent: May 7, 2019

(54) RAILWAY AXLEBOX BEARING ASSEMBLY WITH MOUNTING SURFACE

(71) Applicant: Aktiebolaget SKF, Gothenburg (SE)

(72) Inventors: François Champalou, Chaumont-sur-Loire (FR); Thierry Le Moigne, Luynes (FR)

(73) Assignee: Aktiebolaget SKF, Göteborg (SE)

( * ) Notice: Subject to any disclaimer, the term of this patent is extended or adjusted under 35 U.S.C. 154(b) by 324 days.

(21) Appl. No.: 15/409,866

(22) Filed: Jan. 19, 2017

(65) Prior Publication Data

US 2017/0217453 A1 Aug. 3, 2017

(30) Foreign Application Priority Data

Jan. 28, 2016 (EP) ..................... 16153213

(51) Int. Cl.
*B61F 15/02* (2006.01)
*B61F 15/20* (2006.01)
*F16C 27/06* (2006.01)

(52) U.S. Cl.
CPC .............. *B61F 15/02* (2013.01); *B61F 15/20* (2013.01); *F16C 27/066* (2013.01)

(58) Field of Classification Search
CPC .......... B61F 15/00; B61F 15/02; B61F 15/04; B61F 15/12; B61F 15/20
See application file for complete search history.

(56) References Cited

U.S. PATENT DOCUMENTS

| | | | | |
|---|---|---|---|---|
| 1,952,710 A | * | 3/1934 | Horger .................... | B61F 15/04 105/222 |
| 2,176,244 A | * | 10/1939 | Brittain, Jr. ............. | B61F 15/00 105/218.1 |
| 2,783,102 A | * | 2/1957 | Palmgren ................ | B61F 15/00 384/459 |
| 5,024,449 A | * | 6/1991 | Otto ........................ | B61F 15/22 277/353 |
| 2014/0093199 A1 | * | 4/2014 | Fujiwara ................. | B61F 15/12 384/448 |
| 2017/0137041 A1 | * | 5/2017 | Fenayon ................. | B61F 15/12 |
| 2017/0137042 A1 | * | 5/2017 | Fenayon ................. | B61F 15/06 |

FOREIGN PATENT DOCUMENTS

| | | |
|---|---|---|
| EP | 2557017 A1 | 2/2013 |
| WO | 2012066169 A1 | 5/2012 |
| WO | 2013030615 A1 | 3/2013 |
| WO | 2016008531 A1 | 1/2016 |

* cited by examiner

*Primary Examiner* — Jason C Smith
(74) *Attorney, Agent, or Firm* — Bryan Peckjian; SKF USA Inc. Patent Dept.

(57) ABSTRACT

The invention relates to a railway axlebox bearing assembly including a radially outer mounting surface configured to be mounted so as to face a radially inner mounting surface of an axlebox housing. It is proposed to further provide the assembly with least two spacer elements configured to be mounted between the radially outer mounting surface and the mounting surface of an axlebox housing.

11 Claims, 5 Drawing Sheets

RAILWAY AXLEBOX BEARING ASSEMBLY WITH MOUNTING SURFACE

CROSS REFERENCE TO RELATED APPLICATIONS

This application claims priority to European patent application no. 16153213.0 filed on Jan. 28, 2016, the contents of which are fully incorporated herein by reference.

FIELD OF THE INVENTION

This invention is related to a railway axlebox bearing assembly having a radially outer mounting surface. In particular, the invention is related to a railway axlebox bearing assembly having a radially outer mounting surface configured to be mounted so as to face a radially inner mounting surface.

BACKGROUND OF THE INVENTION

Railway axleboxes include bearing housings configured to directly or indirectly mount roller bearings supporting the axles of the railway vehicle. In the so-called two-part design, the housing has a split design with an upper and a lower part each having a semi-circular bearing seat surface encompassing the radially outer surface of the baring, which is then the mounting surface of the bearing assembly.

In the so-called three-part design, the bearing is fitted into an outer sleeve, which is then held in the housing and which provides the radially outer mounting surface.

In both cases, the risk of fretting corrosion at the interface between the radially outer mounting surface and the inner surface of the housing his high. This risk is increased by current returns between the surfaces. Further the problem of inaccurate location of the bearing load is likely to arise if the machining of either the mounting surface of the inner surface of the housing happens to be imprecise. Initial imprecisions or fretting corrosion may further lead to radial or axial play and cause wear.

BRIEF SUMMARY OF THE INVENTION

The invention relates to a railway axlebox bearing assembly including a radially outer mounting surface configured to be mounted so as to face a radially inner mounting surface of an axlebox housing.

According to one aspect of the invention, it is proposed to further provide the assembly with at least two spacer elements configured to be mounted between the radially outer mounting surface and the mounting surface of an axlebox housing.

Due to the additional spacer elements, it is possible to Decrease the corrosion between bearing and upper and lower link arms, to locate the load patch precisely, to provide electrical isolation between bearing and upper/lower link arm and to reduce or avoid wear of the sleeve and/or the housing. Fretting corrosion can be avoided or at least strongly reduced.

The invention is applicable to any kind of axlebox or wheel bearing in railway applications, including bogie bearings.

In a preferred embodiment of the invention, the at least two spacer elements are made of electrically isolating material.

According to a further aspect of the invention, the at least two spacer elements cover an angular sector of between 120° and 180° of the radially outer mounting surface.

The inventors further propose to provide the bearing assembly with an outer sleeve configured to accommodate an outer bearing ring of the bearing assembly, wherein the radially outer mounting surface is the radially outer surface of the sleeve.

In a preferred embodiment of the invention, the radially outer mounting surface includes recesses configured to accommodate the at least two spacer elements.

According to one aspect of the invention, it is proposed to further provide the assembly anti-rotation means configured to avoid a slipping of the spacer elements in relation to the mounting surfaces. The anti-rotation means could be configured as recesses, a bolt, pin or screw or by a glue or any combination of the latter alternatives.

In a preferred embodiment of the invention, the at least two spacer elements are strip-like elements placed parallel to each other with their longitudinal directions oriented in a circumferential direction of the mounting surface.

The inventors further propose to provide the bearing assembly with at least two groups of spacer elements, wherein the spacer elements in one group are aligned in one radial plane and are distributed over the circumference of the outer mounting surface.

According to a further aspect of the invention, at least one of the groups includes two spacer elements covering angular sectors covering, in sum, 360° of the circumference of the radially outer mounting surface.

According to one embodiment of the invention, the spacer elements are sheet metal parts, wherein the railway axlebox bearing assembly further includes isolating O-rings mounted on the spacer elements to avoid electrical contact between the spacer elements and the axlebox housing and to ensure a reliable isolation against return currents.

A further aspect of the invention relates to a railway axlebox including a railway axlebox housing and a railway axlebox bearing assembly as described above mounted in the railway axlebox housing.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE INVENTION

Figure 1:
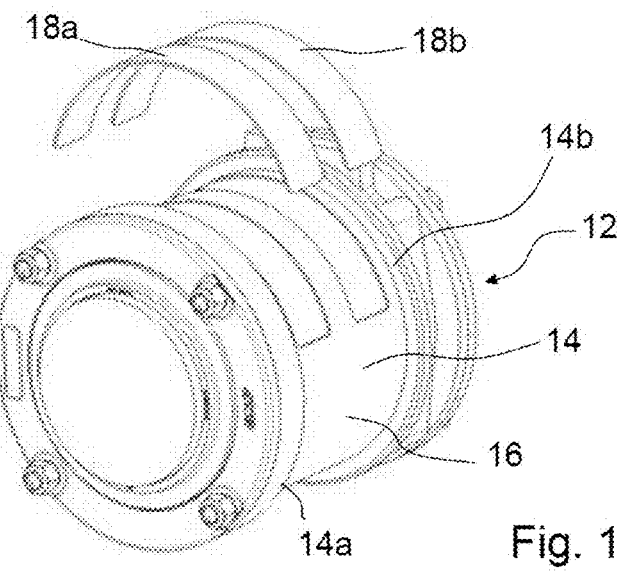
FIG. 1 is an exploded view if a railway axlebox bearing assembly according to a first embodiment of the invention.
Figure 2:
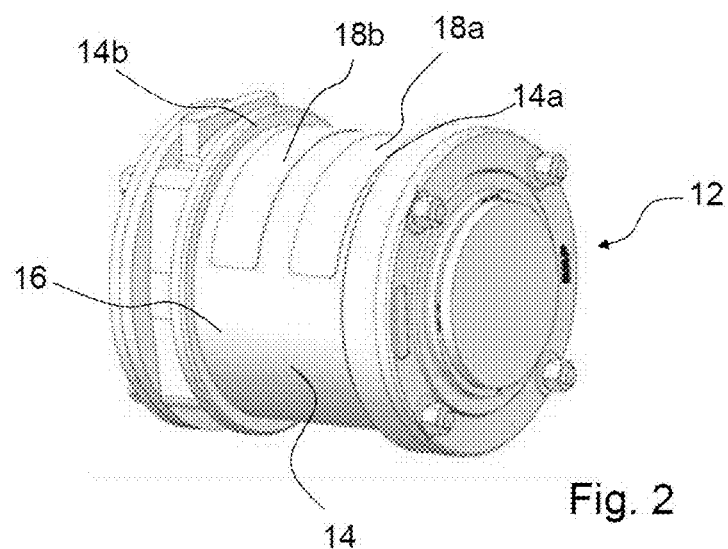
FIG. 2 is perspective view of the railway axlebox bearing assembly according to FIG. 1.
Figure 3:
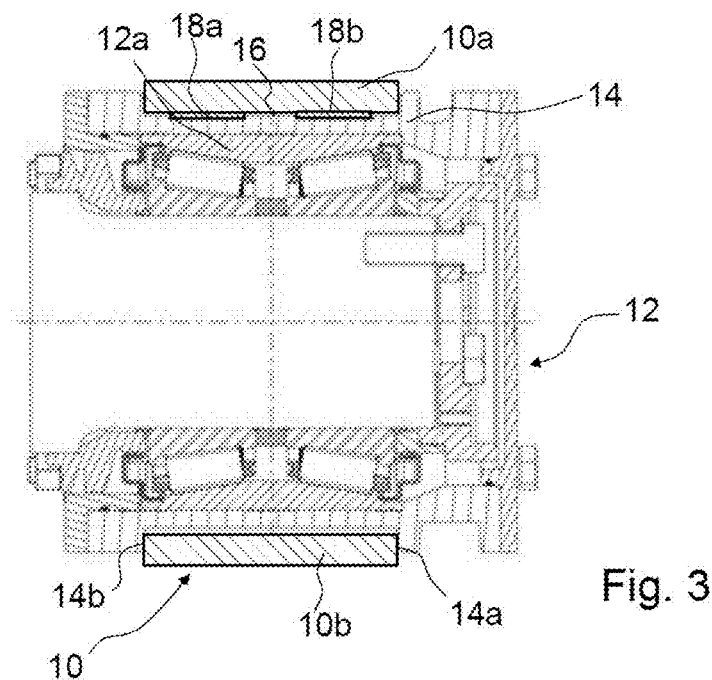
FIG. 3 is a sectional view of a railway axlebox including a railway axlebox housing and a railway axlebox bearing assembly according to FIGS. 1 and 2.

FIGS. 1-3 are different views of a railway axlebox bearing assembly and of a railway axlebox including a railway axlebox housing 10 (FIG. 3) and a railway axlebox bearing assembly 12 according to the invention. The railway axlebox of FIGS. 1-3 is of a three-piece type with a two-piece, split design link arm with an upper link arm housing 10a and a lower link arm housing 10b enabling a radial mounting with an additional sleeve 14 provided on the bearing.

An outer ring 12a of a double-row tapered roller bearing is accommodated in the sleeve 14 and the radially outer surface of the sleeve 14 is mounting surface 16 configured to be mounted so as to face a radially inner mounting surface 16 of the axlebox housing 10, i.e. the upper link arm housing 10a and a lower link arm housing 10b. The mounting surface 16 includes two lateral rims protruding in a radial direction forming shoulders 14a, 14b for axial abutment of the housing 10 so as to avoid axial displacement of the sleeve 14 within the housing 10.

According to the invention, the assembly further includes two strip-shaped spacer elements 18a, 18b configured to be mounted between the radially outer mounting surface 16 and the mounting surface 16 of an axlebox housing 10. The spacer elements 18a, 18b are placed parallel to each other with an axial offset and with their longitudinal directions oriented in a circumferential direction of the mounting surface 16.

The placement and orientation of the spacer elements 18a, 18b in the circumferential direction of the sleeve 14 is set such that the spacer elements 18a, 18b are oriented upward, i.e. in the main load direction of the bearing.

In the embodiment of FIG. 1, the two spacer elements 18a, 18b are made of electrically isolating material, for example in a plastic material, an elastomeric material or any suitable material or any material provided with an electrically insulating coating. The two spacer elements 18a, 18b are bent with a bending radius essentially corresponding to the curvature radius of the mounting surface 16 and the length of the spacer elements 18a, 18b is set such that the elements cover an angular sector of 120° of the radially outer mounting surface 16 in its circumferential direction.

Figure 4:
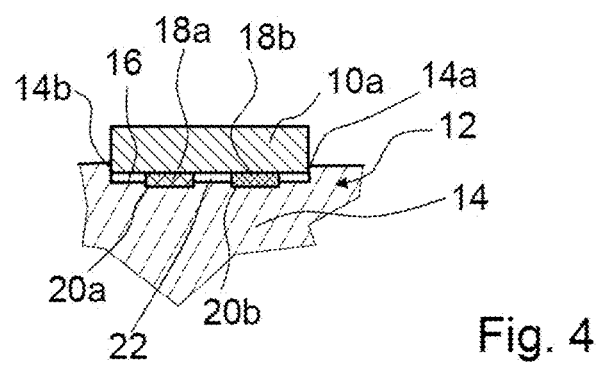
FIG. 4 is a detail of the sectional view of the railway axlebox according to FIG. 3.

FIG. 4 is a detail of the sectional view of the railway axlebox according to FIG. 3.

As illustrated in FIG. 4, the radially outer mounting surface 16 includes recesses 20a, 20b machined out of a main mounting surface 16 of the sleeve 14 and the recesses 20a, 20b match the shape of the spacer elements 18a, 18b such that the recesses 20a, 20b are capable of accommodating one of the spacer elements 18a, 18b, respectively. The depth of the recesses 20a, 20b is strictly smaller than the thickness of the spacer elements 18a, 18b such that the spacer elements 18a, 18b protrude over the main mounting surface 16 of the sleeve 14s when being mounted.

More specifically, the curvature radius of the concave inner surface of the spacer elements 18a, 18b corresponds to the curvature radius of the bottom surfaces of the recesses 20a, 20b and is strictly smaller than the curvature radius of the main mounting surface 16 and the curvature radius of the convex outer surface of the spacer elements 18a, 18b is strictly larger than the curvature radius of the main mounting surface 16.

As a result of the spacer elements 18a, 18b, a gap or clearance 22 is formed between the main mounting surface 16 of the sleeve 14 and the radially inner surface of the upper housing 10 part.

The spacer elements 18a, 18b fit tightly into the recesses 20a, 20b such that the recesses 20a, 20b hold the spacer elements 18a, 18b tightly in an axial and circumferential direction. The mounting may be done by press-fitting, sticking, screwing or clamping. In alternative embodiments, the spacer elements 18a, 18b may be directly molded onto the radially outer surface of the sleeve 14. The recesses 20a, 20b are therefore anti-rotation means configured to avoid a slipping of the spacer elements 18a, 18b in relation to the mounting surface 16s. In alternative embodiments, the anti-rotation means could be configured as recesses 20a, 20b, a bolt, pin or screw or by a glue or any combination of the latter alternatives.

Figure 5:
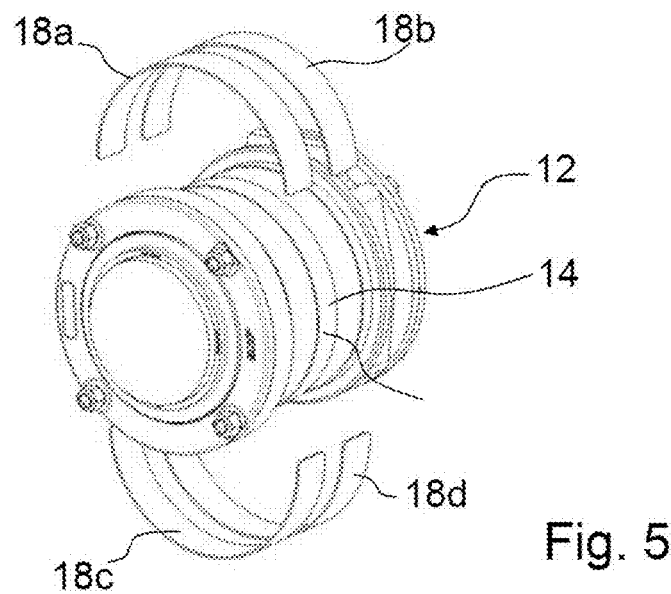
FIG. 5 is an exploded view of a railway axlebox bearing assembly according to a second embodiment of the invention.
Figure 6:
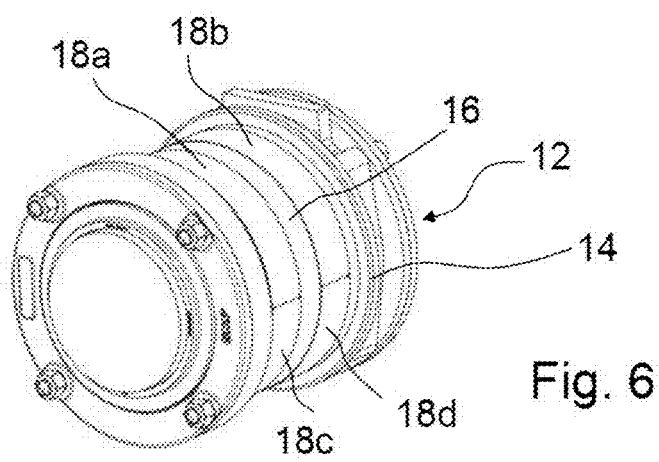
FIG. 6 is a perspective view of the axlebox bearing assembly according to FIG. 5.

FIG. 5 is an exploded view of a railway axlebox bearing assembly 12 according to a second embodiment of the invention and FIG. 6 is a perspective view of the axlebox bearing assembly 12 according to FIG. 5.

According to the second embodiment of the invention, the assembly includes a total of four strip-like spacer elements 18a, 18b, 18c, 18d each covering an angular sector of 180° of the radially outer mounting surface 16. Two of the spacer elements 18a, 18b, 18c, 18d are combined to form a group and are aligned in one radial plane and so as to cover, in sum, 360° of the circumference of the radially outer mounting surface 16, respectively. The recesses 20a, 20b accommodating the spacer elements 18a, 18b are extended to ring-shaped recess covering the entire circumference of the sleeve 14.

Figure 7:
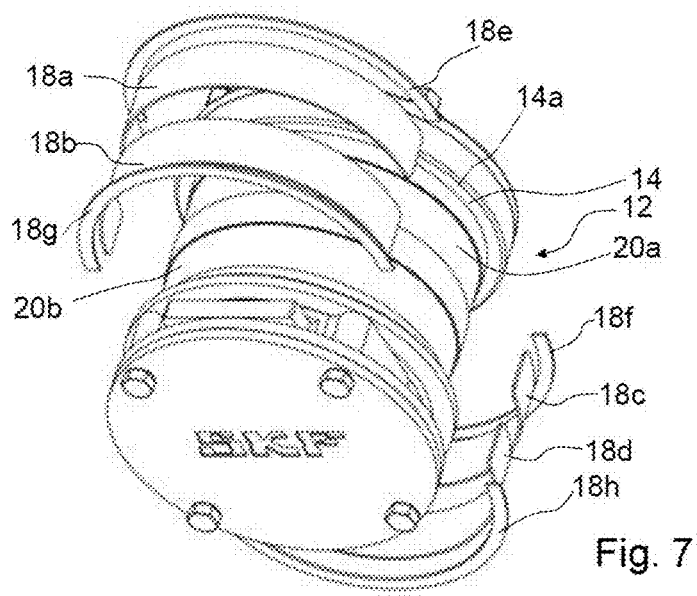
FIG. 7 is an exploded view of a railway axlebox bearing assembly according to a third embodiment of the invention.
Figure 8:
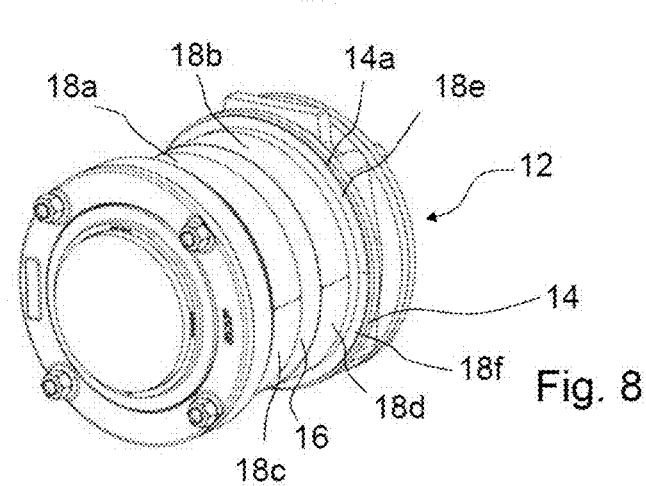
FIG. 8 is a perspective view of the axlebox bearing assembly according to FIG. 7.

FIG. 7 is an exploded view of a railway axlebox bearing assembly 12 according to a third embodiment of the invention. FIG. 8 is a perspective view of the axlebox bearing assembly 12 according to FIG. 7 and FIG. 9 is a detail of a sectional view of the railway axlebox according to FIG. 8.

Figure 9:
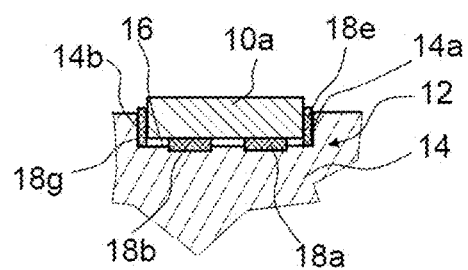
FIG. 9 is a detail of a sectional view of the railway axlebox according to FIG. 8.

According to the third embodiment of the invention, the assembly includes a total of eight strip-like spacer elements 18a, 18b, 18c, 18d, 18e, 18f, 18g, 18h, wherein four of the spacer elements 18a, 18b, 18c, 18d correspond to the spacer elements 18a, 18b of the second embodiment of the invention and the remaining four of the spacer elements 18e, 18f, 18g, 18h are arc-shaped elements configured to be placed axially between the axial end surface of the sleeve 14 and the shoulders 14a, 14b of the sleeve 14 for axial abutment such that a direct contact between the axial surfaces of the spacer elements 18a-18h and the housing 10 is avoided also in the axial direction as shown in FIG. 9.

Figure 10:
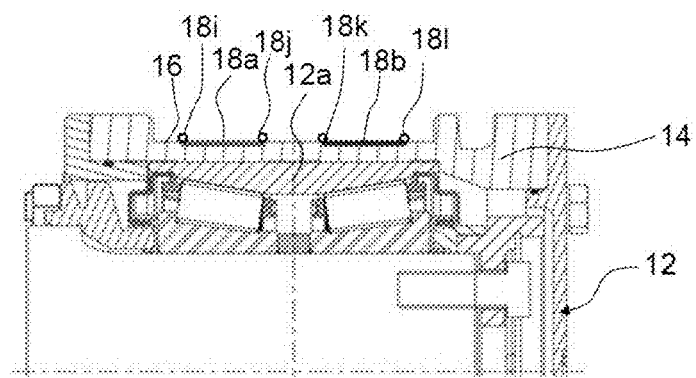
FIG. 10 is a sectional view of a railway axlebox bearing assembly according a fourth embodiment of the invention.

FIG. 10 is a sectional view of a railway axlebox bearing assembly 12 according a fourth embodiment of the invention, which differs from the first embodiment of the invention in that the spacer elements 18a, 18b are made of sheet metal and in that 4 isolating O-rings made of rubber are provided on a top surface of the spacer elements 18a, 18b as additional spacer elements 18i, 18j, 18k, 18l to avoid electric contact and current return between the housing 10 and the sleeve 14.

As a further alternative embodiment of the invention, the metallic spacer elements 18a, 18b could be provided with an insulating coating.

The additional spacer elements 18a-18l help to solve some problems such as environmental corrosion, fretting corrosion and wear in an easy and cost-effective way. Further, the spacer elements 18a-18l enable a better localization of the bearing load and an isolation of the bearing for current return and a prolongation of the life cycle for replacement of sleeve 14 and housing 10. These parts are easy to manufacture (sheet metal parts or plastic parts) and also easy to mount.

The invention claimed is:

1. A railway axlebox bearing assembly comprising:
a radially outer mounting surface configured to be mounted so as to face a radially inner mounting surface of an axlebox housing, and
at least two spacer elements configured to be mounted between the radially outer mounting surface and the mounting surface of an axlebox housing.

2. The railway axlebox bearing assembly according to claim 1, wherein the at least two spacer elements are made of electrically isolating material.

3. The railway axlebox bearing assembly according to claim 2, wherein the at least two spacer elements cover an angular sector of between 120° and 180° of the radially outer mounting surface.

4. The railway axlebox bearing assembly according to claim 1, further comprising an outer sleeve configured to accommodate an outer bearing ring of the bearing assembly, wherein the radially outer mounting surface is the radially outer surface of the sleeve.

5. The railway axlebox bearing assembly according to claim 1, wherein the radially outer mounting surface includes recesses configured to accommodate the at least two spacer elements.

6. The railway axlebox bearing assembly according to claim 1, further comprising anti-rotation means configured to avoid a slipping of the spacer elements in relation to the mounting surfaces.

7. The railway axlebox bearing assembly according to claim 1, wherein the at least two spacer elements are placed parallel to each other with their longitudinal directions oriented in a circumferential direction of the mounting surface.

8. The railway axlebox bearing assembly according to claim 1, further comprising at least two groups of spacer elements, wherein the spacer elements in one group are aligned in one radial plane and are distributed over the circumference of the outer mounting surface.

9. The railway axlebox bearing assembly according to claim 8, wherein at least one of the groups includes two spacer elements covering angular sectors covering, in sum, 360° of the circumference of the radially outer mounting surface.

10. The railway axlebox bearing assembly according to claim 1, wherein the spacer elements include sheet metal spacer elements, and wherein the railway axlebox bearing assembly further includes isolating o-rings mounted on the spacer elements to avoid electrical contact between the sheet metal spacer elements and the axlebox housing.

11. A railway axlebox comprising:
a railway axlebox housing, and
a railway axlebox bearing assembly having a radially outer mounting surface configured to be mounted so as to face a radially inner mounting surface of an axlebox housing, and at least two spacer elements configured to be mounted between the radially outer mounting surface and the mounting surface of an axlebox housing, wherein
the railway axlebox bearing assembly is mounted in the railway axlebox housing.

* * * * *